(12) United States Patent
Zhao et al.

(10) Patent No.: US 12,413,437 B2
(45) Date of Patent: Sep. 9, 2025

(54) METHOD AND APPARATUS FOR INFORMATION INTERACTION, AND ELECTRONIC DEVICE

(71) Applicant: BEIJING ZITIAO NETWORK TECHNOLOGY CO., LTD., Beijing (CN)

(72) Inventors: Liyue Zhao, Beijing (CN); Bowen Shen, Beijing (CN); Hongze Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/408,064

(22) Filed: Jan. 9, 2024

(65) Prior Publication Data
US 2024/0146564 A1    May 2, 2024

Related U.S. Application Data

(63) Continuation of application No. PCT/CN2022/109962, filed on Aug. 3, 2022.

(30) Foreign Application Priority Data

Aug. 6, 2021 (CN) .......................... 202110905719.X
Mar. 31, 2022 (CN) .......................... 202210352728.5

(51) Int. Cl.
*H04L 12/18* (2006.01)

(52) U.S. Cl.
CPC ........ *H04L 12/185* (2013.01); *H04L 12/1822* (2013.01)

(58) Field of Classification Search
CPC .......................... H04L 12/185; H04L 12/1822
See application file for complete search history.

(56) References Cited

U.S. PATENT DOCUMENTS

2017/0374425 A1* 12/2017 Disley .................. G06F 3/0482
2018/0197144 A1    7/2018 Frank et al.
(Continued)

FOREIGN PATENT DOCUMENTS

| CN | 105516296 A | 4/2016 |
|---|---|---|
| CN | 105530169 A | 4/2016 |

(Continued)

OTHER PUBLICATIONS

International Patent Application No. PCT/CN2022/109962; Int'l Search Report; dated Oct. 26, 2022; 2 pages.

(Continued)

*Primary Examiner* — Farzana B Huq
(74) *Attorney, Agent, or Firm* — BakerHostetler

(57) ABSTRACT

An information interaction method and apparatus, and an electronic device are disclosed in embodiments of this disclosure. The method includes: displaying a team identifier on an information interaction interface, where a team indicated by the team identifier has an associated team member set; and displaying at least one group associated with the team indicated by the team identifier, where a group of at least one group at least includes some members in the team member set. The team identifier is displayed on the information interaction interface, where the team indicated by the team identifier has the associated team member set; and at least one group associated with the team indicated by the team identifier is displayed, where the group of at least one group at least includes some members in the team member set.

17 Claims, 3 Drawing Sheets

---

101 — Display a team identifier on an information interaction interface, where a team indicated by the team identifier has a team member set associated 102 — Display at least one group associated with the team indicated by the team identifier, where a group of the at least one group at least includes a part of members in the team member set

(56) References Cited

U.S. PATENT DOCUMENTS

| | | | | |
|---|---|---|---|---|
| 2020/0311579 A1* | 10/2020 | Dial | ................... | G06Q 10/1095 |
| 2020/0327171 A1* | 10/2020 | Spataro | ................... | G06F 16/93 |
| 2021/0365630 A1* | 11/2021 | Itani | ...................... | G06F 40/166 |
| 2021/0399911 A1* | 12/2021 | Jorasch | ............... | H04L 12/1818 |
| 2022/0103566 A1* | 3/2022 | Faulkner | ................. | H04L 67/06 |
| 2023/0034668 A1* | 2/2023 | Han | ................... | H04L 12/1827 |

FOREIGN PATENT DOCUMENTS

| | | |
|---|---|---|
| CN | 107425991 A | 12/2017 |
| CN | 107733663 A | 2/2018 |
| CN | 107734077 A | 2/2018 |
| CN | 109428737 A | 3/2019 |
| CN | 111108497 A | 5/2020 |

OTHER PUBLICATIONS

Written Opinion for International Application No. PCT/CN2022/109962, mailed Oct. 26, 2022, 7 Pages.

* cited by examiner

METHOD AND APPARATUS FOR INFORMATION INTERACTION, AND ELECTRONIC DEVICE

CROSS-REFERENCE TO RELATED APPLICATION(S)

This disclosure is a Continuation application of International Patent Application No. PCT/CN2022/109962, filed Aug. 3, 2022, which claims priority to Chinese Patent Application No. 202110905719. X, filed on Aug. 6, 2021, and entitled "Information interaction method and apparatus, and electronic device", and Chinese Patent Application No. 202210352728.5, filed on Mar. 31, 2022, and entitled "Information interaction method and apparatus, and electronic device", which are incorporated in their entireties herein by reference.

FIELD

This disclosure relates to the technical field of Internet, and in particular to an information interaction method and apparatus, and an electronic device.

BACKGROUND

With instant messaging applications, a user has a chance to exchange information with a contact in real time. The contact may be an individual contact or a group contact. The group contact at least includes two contacts.

Individual chat information of information interaction between the user and the individual contact and/or group chat information of information interaction between the user and a group chat contact may be displayed on an information stream display interface of the instant messaging application.

SUMMARY

The summary of this disclosure is provided to introduce concepts in a simplified form, and these concepts are described in detail in detailed description of embodiments below. The summary of this disclosure is neither intended to identify key features or essential features of claimed technical solutions, nor intended to limit the scope of the claimed technical solutions.

An method and apparatus for information interaction, and an electronic device are provided in embodiments of this disclosure.

In a first aspect, a method for information interaction is provided in an embodiment of this disclosure. The method includes: displaying a team identifier on an information interaction interface, where a team indicated by the team identifier has an associated team member set; and displaying at least one group associated with the team indicated by the team identifier, where a group of the at least one group at least includes at least part of members in the team member set.

In a second aspect, a method for information interaction is provided in an embodiment of this disclosure. The method includes: displaying a team identifier on an information interaction interface, where a team indicated by the team identifier has an associated team member set, the team is associated with at least one type of information communication entity, and the information communication entity is configured for information interaction among team members; and controlling information interaction permission in the information communication entity based on the team member set of the team.

In a third aspect, an apparatus for information interaction is provided in an embodiment of this disclosure. The apparatus includes: a first display unit configured to display a team identifier on an information interaction interface, where a team indicated by the team identifier has an associated team member set; and a second display unit configured to display at least one group associated with the team indicated by the team identifier, where a group of the at least one group at least includes at least part of members in the team member set.

In a fourth aspect, an apparatus for information interaction is provided in an embodiment of this disclosure. The apparatus includes: a third display unit configured to display a team identifier on an information interaction interface, where a team indicated by the team identifier has an associated team member set, the team is associated with at least one type of information communication entity, and the information communication entity is configured for information interaction among team members; and a control unit configured to control information interaction permission in the information communication entity based on the team member set of the team.

In a fifth aspect, an electronic device is provided in an embodiment of this disclosure. The electronic device includes: one or more processors; and a storage means configured to store one or more programs, where the one or more programs, when executed by the one or more processors, cause the one or more processors to implement the method for information interaction in the first aspect or the method for information interaction in the second aspect.

In a sixth aspect, a computer-readable storage medium is provided in an embodiment of this disclosure. The computer-readable storage medium stores a computer program, where the computer program, when executed by a processor, implements the method for information interaction in the first aspect or the method for information interaction in the second aspect.

BRIEF DESCRIPTION OF THE DRAWINGS

The above and other features, advantages, and aspects in each embodiment of this disclosure will become more apparent with reference to the accompanying drawings and the following particular embodiments. The same or similar reference numerals denote the same or similar elements throughout the accompanying drawings. It should be understood that the accompanying drawings are schematic, and devices and elements are not necessarily drawn to scale.

FIG. 4 is a flowchart of a method for information interaction according to some other embodiments of this disclosure;

DETAILED DESCRIPTION OF EMBODIMENTS

Embodiments of this disclosure will be further described in detail below in conjunction with the accompanying drawings. Although some embodiments of this disclosure are shown in the accompanying drawings, it should be understood that this disclosure can be implemented in various forms and should not be interpreted as being limited to the embodiments set forth herein. On the contrary, these embodiments are provided for more thorough and complete understanding of this disclosure. It should be understood that the accompanying drawings and the embodiments of this disclosure are merely illustrative, and are not intended to limit the scope of protection of this disclosure.

It should be understood that various steps described in a method embodiment of this disclosure can be executed in different orders and/or in parallel. In addition, the method embodiment can include additional steps and/or will not execute the steps shown. The scope of this disclosure is not limited in this respect.

As used herein, the terms "comprise", "include", and their variations are open-ended, i.e. "comprise, but is not limited to" and "include, but is not limited to". The term "based on" means "at least partially based on". The term "an embodiment" means "at least one embodiment". The term "another embodiment" means "at least one further embodiment". The term "some embodiments" means "at least some embodiments". The definitions relevant to other terms are set forth in the description below.

It should be noted that the concepts such as "first" and "second" mentioned in this disclosure are merely used to distinguish between different apparatuses, modules, or units instead of defining the order or interdependence relation of functions executed by these apparatuses, modules, or units.

It should be noted that the modifiers "a", "an", and "a plurality of" mentioned in this disclosure are illustrative rather than restrictive. Those skilled in the art should understand that these modifiers should be interpreted as "one or more" unless clearly indicated otherwise in the context.

The names of messages or information interacting between a plurality of apparatuses in the embodiments of this disclosure are merely for description, and are not intended to limit the scopes of these messages or information.

Figure 1:
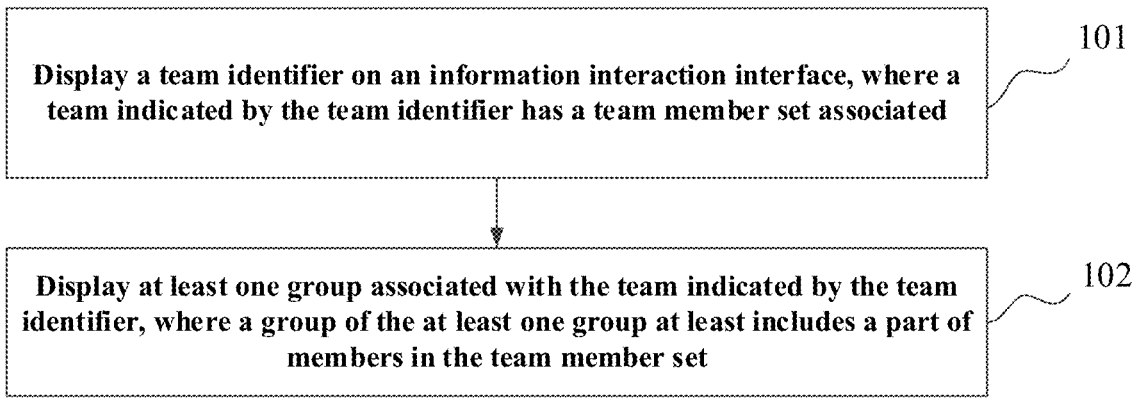
FIG. 1 is a flowchart of a method for information interaction according to some embodiments of this disclosure.

With reference to FIG. 1, a flow of a method for information interaction according to an embodiment of this disclosure is shown in FIG. 1. As shown in FIG. 1, the method for information interaction includes the following:

Step 101, a team identifier is displayed on an information interaction interface, where a team indicated by the team identifier has an associated team member set.

The information interaction interface herein may be an information interaction interface of an instant messaging application. The team identifier may be displayed on the information interaction interface.

The above team identifier may be configured to indicate one team. The above team identifier may include, but is not limited to, text, a symbol, a picture, etc. Different teams may have different team identifiers.

The above group member set may be a member set formed by all members of the team. For example, when the team includes 2 members, the above team member set is a member set composed of the 2 members. When the team includes 100 members, the above team member set is a member set composed of the 100 members. The team members herein may include a user.

Step 102, at least one group associated with the team indicated by the team identifier is displayed, where a group of the at least one group at least includes at least part of members in the team member set.

The team indicated by the above team identifier may be associated with at least one group.

The group herein may be a group in the instant messaging application. The group may be a tool for information interaction among the group members.

The group herein may be associated with a group member set. The group member set includes at least one group member. The above group member may be a team member.

In some application scenarios, the at least one group may be displayed as the team identifier is displayed. For example, when the user executes a selection operation on the first identifier associated with the team displayed on the information interaction interface, the team identifier of the team may be displayed on the information interaction interface, and at least one group associated with the team may be displayed in a display area corresponding to the team.

In some other application scenarios, at least one group may be displayed when an instruction to display the group associated with the team is received. For example, when the user executes a selection operation on a team screening tag associated with the team displayed on the information interaction interface, the team identifier of the team may be displayed on the information interaction interface. After the user executes the selection operation on the team identifier, at least one group associated with the team may be displayed on the information interaction interface.

Alternatively, the team is associated with the team screening tag. The method for information interaction further includes: before a team identifier is displayed on an information interaction interface, firstly, displaying the team screening tag on the information interaction interface; and secondly, displaying at least one team identifier on the information interaction interface upon determining that the team screening tag is selected.

The team screening tag is further associated with other teams.

In these alternative implementations, when the team screening tag is selected, team information of a plurality of teams associated with the team screening tag may be displayed on the information interaction interface. The team information includes the team identifier.

The other teams and the team may be arranged on the information interaction interface in sequence according to a preset ranking rule. For example, the other teams and the team are arranged in a successive creation order or according to names of respective team identifiers of the other teams and the team.

In some embodiments, the above step 101 includes the following: the team identifier is displayed in a conversation stream on the information interaction interface where the team screening tag is selected. Step 102 includes the following: information of each associated group is displayed in the conversation stream next to the team identifier; or, information of each associated group is displayed next to the team identifier in response to determining that the team identifier in the conversation stream is triggered.

In some alternative implementations, the method for information interaction further includes the following: information of the group associated with the team is displayed in the conversation stream on the information interaction interface upon determining that the team screening tag is selected; and information of the group associated with the team indicated by the at least one team identifier is displayed in the conversation stream displayed on the information interaction interface upon determining that a screening tag other than the team screening tag on the information interaction interface is selected; where the conversation stream is configured to display individual conversation information and group conversation information.

In these alternative implementations, the group associated with the team may be displayed on an information interaction interface for other screening tags other than the information interaction interface for the team screening tag. Accordingly, the user can browse the information of the group associated with the team in real time.

In some alternative implementations, upon determining that the screening tag other than the team screening tag on the information interaction interface is selected, the information of the group associated with the team displayed in the conversation stream includes a team indication identifier, where the team indication identifier is configured to indicate that the group is associated with the team.

The team indication identifier may include, but is not limited to, at least one of the following: text, a letter, a symbol, and a picture. The team indication identifier may be displayed around a target group identifier or displayed as a background of a group identifier of the group associated with the team.

For example, with the team indication identifier including the text "team" as an example, the team indication identifier may be displayed around the group identifier of the group associated with the team, so as to make a prompt that the group is a group associated with the team.

In these alternative implementations, when the information of the group associated with the team is displayed on a display interface displaying information streams corresponding to other screening tags, the group may be rapidly identified as a group associated with the team according to the team indication identifier.

Further, the team indication identifier may include a first indication identifier configured to indicate the team associated with the group.

The first indication identifier above may include, but is not limited to: text, a letter, a symbol, and/or a picture. The first indication identifier herein may include, for example, team identifier information of a team associated with a target group, such as an icon, a name, etc. of the team associated.

In this way, the user can rapidly identify which team is associated with the target group in an information stream display interface for other non-team interaction information. The user can determine whether to process a message within the target group as rapidly as possible.

In some alternative implementations, a group member set of the group of the at least one group is consistent with the team member set.

In these application scenarios, the group member set of each group is consistent with the team member set. That is, each team member may also be a group member of each group.

Each group member of the group may also be the team member.

In these application scenarios, the team member set is consistent with the group member set, and the team member may browse information within each group.

In some other alternative implementations, the at least one group includes: a group of which a group member set is consistent with the team member set, and a group of which a group member set is a proper sub-set of the team member set.

In these application scenarios, group member sets of some groups in the at least one group may be consistent with the team member set. The group member sets of some groups are proper sub-sets of the team member set.

The expression that the group member sets of some groups are proper sub-sets of the team member set means that all group members in the group member sets are the team members, while some team members in the team member set are not the group members of these groups.

In these alternative implementations, the group associated with the team may include a group of which a group member set may be consistent with the team member set, and a group of which a group member set is smaller than the team member set. In these alternative implementations, a message within any one of the groups is browsed only within the range of the team members of the any one of the groups, so that the information diffusion boundary is limited to the range of the team members.

In yet other alternative implementations, the at least one group includes: a group of which a group member set is a sub-set of the team member set, and a group of which a group member set includes at least part of members in the team member set and a non-team member.

In these application scenarios, the group of which a group member set is the sub-set of the team member set includes the following groups: the group of which a group member set is consistent with the team member set, and the group of which a group member set is a proper sub-set of the team member set.

In these application scenarios, at least one group further includes a group of which
some group members are non-team members. Some group members of these groups may be the team members.

In these alternative implementations, the groups associated with the team may also include the group of which some group members are the non-team members other than the group of which group members are the team members. Accordingly, the group diversity can be realized.

In these alternative implementations, at least one group displayed on the information interaction interface is a group for which a current user who logs in the information interaction interface has viewing permission. The groups for which a current user has viewing permission include: a group in which the current user is a group member, and a group in which the current user is not a group member but providing viewing permission to the current user.

In some alternative implementations, in the group in which the current user is a group member, the current user may browse information of these groups. The information of the groups may include group identifiers of the groups, information streams within the groups, etc.

For the group in which the current user is not a member but providing viewing permission to the current user, the current user may browse the information of these groups on the information interaction interface. The information of these groups may include group identifiers of the groups, so that the user can determine whether to join the groups according to the group identifiers. In some embodiments, for the group in which the current user is not a group member but providing viewing permission to the current user, a group joining entry may be displayed according to a user operation. Accordingly, the user can initiate a group joining operation according to the group identifier, so as to join the group conveniently.

Further alternatively, some groups of the at least one group are invisible to a user who does not have viewing permission.

In these alternative implementations, some groups of at least one group for which the current user having viewing permission are invisible to the user who does not have viewing permission.

Some groups of the at least one group may be invisible to some users. Some users herein may be the team members of the team. For these groups, the user without viewing permission cannot see group information of these groups. Accordingly, the privacy of the group message is realized. Moreover, for preset team members who are not the group members of the group, information such as the group identifier of the group is displayed, so that the team members can determine whether to join the group according to the group identifier.

In some alternative implementations, a first reminding mode is used as a message reminding mode of some groups of the at least one group by default. Group member sets of these groups are consistent with the team member set, and a message reminding frequency corresponding to the first reminding mode is lower than a preset reminding threshold.

The above reminding threshold may be 1 time/day, etc. The preset reminding threshold may be set according to a specific application scenario, which will not be limited herein. Illustratively, the first reminding mode herein is, for example, a reminding mode of turning off a message notification.

In the case of turning off the message notification, when the group receives a new message, prompt information indicating that the new message is received may not be sent to the user. When selecting to browse the message of the group, the user may browse an unread message.

In these alternative implementations, the first reminding mode is used in the at least some groups by default. The interference to the user by reminding the user of the new message when the group receives the new message may be reduced.

Further alternatively, the above information interaction method further includes the following: the first reminding mode is changed to a second reminding mode according to a change operation on the message reminding mode by the current user who logs in the information interaction interface. A message reminding frequency of the second reminding mode is higher than that corresponding to the first reminding mode.

Illustratively, the second reminding mode herein is, for example, a reminding mode of opening a message notification.

In these alternative implementations, the current user may change the message reminding mode of one or more groups to the second reminding mode according to his/her own requirements. After the second reminding mode is used in the group, the current user may receive the notification indicating that the group receives the new message with a higher frequency. Accordingly, a current group is reminded that the new message is received.

In the method for information interaction according to the embodiment, the team identifier is displayed on the information interaction interface, where the team indicated by the team identifier has the associated team member set; and at least one group associated with the team indicated by the team identifier is displayed, where the group of the at least one group at least includes at least part of members in the team member set. Accordingly, the information of the group associated with the team is displayed and managed in terms of the team, and the message within the team is limited within the team member set for communication. In this way, the interference to the non-team member can be reduced. Also, the team member may know the information carried by the information communication entity within the team in real time, so that the information within the team is transparentized. The information transparency can be improved while the information interference can be reduced to a certain extent.

In some alternative implementations, an editing operation is executable on an association relation between some groups of the at least one group and the team, and the association relation between the group and the team is changed through the editing operation.

That is, the association relation between some groups of the at least one group and the team is changeable. The association relation may be changed through the editing operation from the user.

Further, the above editing operation includes: association relation establishment and/or association relation unbinding.

It can be understood that the user who performs the editing operation on the above association relation may be a user who has preset permission among the team members. For example, the preset permission may include: group-and-team association relation editing permission, group creation permission, deletion permission, etc.

In these alternative implementations, the user can change the association relation between the group and the team through the editing operation on the association relation conveniently.

In these alternative implementations, the team identifier is displayed in a first display sub-area of a team information display area. The team information display area further includes a second display sub-area, where the second display sub-area is configured to display an extension identifier. The above information display area may be a display area for team information in the information stream. For example, the team information display area may be a part of an information stream display area. The team information display area may display the team identifier, the extension identifier, and information of some messages of the team.

Figure 1A:
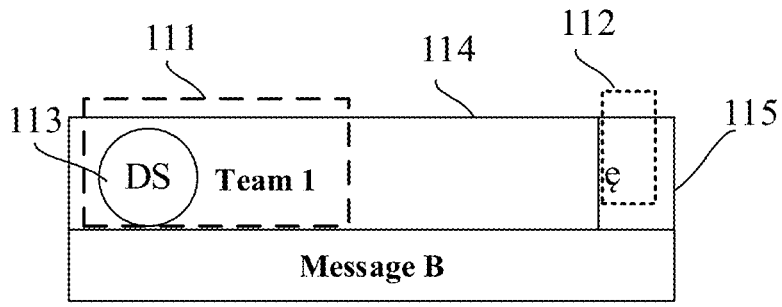
FIG. 1A is a schematic diagram of displaying information in a team information display area.

With reference to FIG. 1A, a schematic diagram of a team information display area is shown in FIG. 1A. As illustrated in the figure, the team information display area may display a team identifier 111, an extension identifier 112, and information "message B" of some messages of the team.

The above team identifier may include, but is not limited to, a graphical identifier, an image identifier, and/or a textual identifier.

As shown in FIG. 1A, the team identifier includes a graphical identifier 113 and a textual identifier "team 1".

The extension identifier is an identifier displayed in the team information display area and configured to indicate an operational item of the team. The extension identifier is shown as " . . . " in FIG. 1A.

In some application scenarios, the above team identifier is displayed in the first display sub-area of the team information display area, and the team information display area further includes the second display sub-area. The second display sub-area is configured to display the extension identifier. The method for information interaction further includes the following: a team setting entry is displayed in response to receiving a first triggering operation executed by the current user on the first display sub-area; or, a team setting entry is displayed in response to receiving a second triggering operation executed by the current user on the second display sub-area.

The above team setting entry includes an entry of an editing operation configured to edit the association relation between the group and the team.

As shown in FIG. 1A, the team information display area includes a first display sub-area 114 and a second display sub-area 115. The above team identifier 111 is displayed in the first display sub-area 114. The extension identifier 112 is displayed in the second display sub-area 115.

The team setting entry may be displayed in response to determining that the current user executes the first triggering operation on the first display sub-area 114.

The first triggering operation herein may include a click operation executed through an auxiliary mouse button.

As an example, the first triggering operation may also be a touch operation, etc. executed on the first display sub-area by a time longer than a preset duration. In these examples, the electronic device for displaying the team information is provided with a touch screen, and the first triggering operation is received through the touch screen.

The team setting entry may be displayed in response to determining that the current user executes the second triggering operation on the second display sub-area 115.

The second triggering operation herein may include a click operation executed through a main mouse button.

As an example, the second triggering operation herein may be a conventional touch operation, etc. executed on the second display sub-area. In these embodiments, the above electronic device for displaying the team information is provided with the touch screen.

In these application scenarios, the team setting entry is displayed to the user in different ways, so that the user can set the team through the team setting entry.

For example, the team setting entry may include a team member setting entry, an entry of an editing operation configured to edit the association relation between the group and the team, etc.

The entry of an editing operation configured to edit the association relation between the group and the team includes a group addition option. A group addition window is entered through a triggering operation executed on the group addition option.

In these alternative implementations, the team identifier is displayed in the team information display area of the team. The editing operation includes association relation establishment. The association relation between the group and the team is established based on the following steps:

Step 11, a first preset operation executed by the current user on the team information display area is received, and a group addition option configured to indicate addition of the group associated with the team is displayed.

Step 12, the group addition window is displayed according to a received selection operation executed on the group addition option.

Step 13, a target group is associated with the team indicated by the team identifier according to a target group determination operation executed by the user on the group addition window.

Further alternatively, the target group determination operation may include: existing group selection, and/or new group creation.

That is, an existing group may be selected as the group associated with the team, or a new group associated with the team may also be created.

In some application scenarios, the group addition option displayed in step 11 includes an existing group addition option.

In these application scenarios, step 12 includes the following: an existing group list is displayed according to a received selection operation executed on the existing group addition option; where the existing group list includes at least one existing group. The step 13 includes the following: at least one target group is determined according to a selection operation executed by the user on the existing group list, and an association relation between the target group and the team is established.

Alternatively, the existing group list includes: a first type of group in which the current user is a group owner or a group administrator; or, a first type of group in which the current user is a group owner or a group administrator, and a second type of group in which the current user is a group member but not a group owner or a group administrator.

Further alternatively, upon determining that the existing group list includes the second type of group in which the current user is the group member but not the group owner or the group administrator, determining the at least one target group according to a selection operation executed by the user on the existing group list, and establishing an association relation between the target group and the team include the following: a request message is sent to the group owner or the administrator of the second type of group upon the user executing the selection operation on the second type of group in the existing group list, where the request message is configured to request to associate the second type of group with the team; and the second type of group is determined as the target group in response to confirmation information of agreeing to associate the second type of group with the team.

In these application scenarios, the existing group may be a group associated with the current user who logs in the information interaction interface. The first type of group may be associated with the team according to an operation initiated by the current user to associate the target group with the team in response to determining that the target group indicated by the above operation is the first type of group.

When the current user initiates an operation for associating one or more second type of groups with the team, request information for associating the second type of group with the team may be sent to the group owner or the administrator of the one or more second type of groups in response to determining that the target group indicated by the above operation is the second type of group. After the confirmation information from the group owner or the administrator of the one or more second type of groups is received, the one or more second type of groups are determined as the target group(s), and the association relation between the target group(s) and the team may be established.

In these alternative implementations, the current user is provided with a channel to establish the association relation between the existing group and the team. Accordingly, the current user can establish the association relation between the existing group and the team conveniently.

In some alternative implementations, the step that at least one target group is determined according to a selection operation executed by the user on the existing group list, and an association relation between the target group and the team is established may include the following:

Step 131, in response to determining that the target group includes a non-team group member other than the members of the team, the non-team group member is removed from the target group to obtain a first target group.

Step 132, an association relation between the first target group with the non-team member removed and the team is established; or, inquiry information about whether to add the non-team group member as the team member is displayed, the association relation between the target group and the team is established in response to a confirmation operation made by the current user based on the inquiry information, and the non-team member is added to the team.

In these alternative implementations, whether there is the non-team member in the target group is determined before the existing target group is associated with the team. The non-team member may be removed from the target group to obtain the first target group in response to determining that the target group includes the non-team member. It can be understood that the first target group may still have the same identifier as an original target group. Only the group member of the first target group is changed.

In another embodiment, after confirmation is made by the current user, the non-team member in the target group may also be added to the team member set. Accordingly, the member of the target group is consistent with the team member set, and an information interaction range is limited to a team member range.

By establishing the association relation between the first target group and the team, the group members of the first target group associated with the team are the members of the team. Accordingly, the information of the team can be propagated among only the members of the team. The privacy of the team information can be improved.

Alternatively, the step that at least one target group is determined according to a selection operation executed by the user on the existing group list, and an association relation between the target group and the team is established may also include the following steps:

Step 133, in response to determining that the members of the team include a non-group member other than the target group member, the non-group member is added to a group member set of the first target group, and a second target group is obtained.

Step 134, an association relation between the second target group and the team is established.

In these alternative implementations, in response to determining that the group member set of the first target group obtained in step 132 does not include some members of the team, these members of the team may be added to the group member set of the first target group above. It can be understood that the second target group may have the same group identifier as the first target group, and only group members are changed.

In these alternative implementations, the member of the team is added to the group member set of the first target group, so that a group member set of the second target group obtained is consistent with the team member set. Accordingly, the member of the team can browse a group message of the second target group.

In yet other application scenarios, the group addition option displayed in step 11 includes a new group creation option.

In these application scenarios, step 12 includes: a group creation window configured to create a group is displayed according to a received selection operation on the new group creation option, where the group creation window includes a candidate group member list.

Step 13 includes: a new group member is determined according to a selection operation executed by the user on the candidate group member list; and a new group including the new group member is created, and the new group, as the target group, is associated with the team.

The candidate group member list includes a team member list and/or a non-team member list.

Alternatively, the team member list may be displayed in a first area of the group creation window, and the non-team member list may be displayed in a second area of the group creation window.

The non-team member list includes at least one user serving as a non-team member. The team member list includes at least one team member.

In these application scenarios, the group creation window is provided. In the group creation window, a group member of the created group may be selected from a plurality of members of the team. Therefore, the group member of the new group is controllable to avoid adding the non-team member to the group mistakenly.

In some alternative implementations, the method for information interaction further includes the following: a group type of the target group is determined according to a group type setting operation executed by the user on the target group.

The group type setting operation executed on the target group includes: a selection operation executed by the user on at least one candidate group type option displayed; or, a group type input operation executed by the user on the target group.

In some application scenarios, the target group is the existing group. When the existing group is determined as the target group, a group type option may be displayed. The group type option includes different group type options. For example, the group type option includes a topic group type option and a general group type option that does not limit a topic. The topic group type option is configured to indicate that the group mainly focuses on one or more specific topics for focused communication.

The user may determine the target group type of the target group from the group type options displayed.

That is, the association relation between the existing group and the team is established according to the topic group type option. When the existing group is determined as the target group, and the association relation between the existing group with the team is established, the group type of the existing group may be modified.

In yet other application scenarios, the target group is the new group. In these application scenarios, the group type option may be set in the group creation window for creating a new group. When a new group is created, the user determines a group type of the new group through the group type option.

In addition, the user may also set the group type of the target group through a group type input operation.

In these alternative implementations, the user may modify or set the group type of the target group through the group type setting operation. Accordingly, the user is provided with more group setting functions, improving the user experience.

In some alternative implementations, the editing operation includes unbinding the association relation between the group and the team. The association relation between the group and the team may be unbound based on the following:

Step 14, the association relation between the team and the target group is unbound, and a target group conversation is retained according to a received target group unbinding operation.

Alternatively, the step that a target group conversation is retained includes the follows: conversation information of the target group is displayed on a group information display interface of the information interaction interface.

In these alternative implementations, the target group conversation may still be retained after the association relation between the target group and the team is unbound. The group member of the target group may browse the information within the target group to look up historical information. The group conversation retained may also retain an information interaction function of the group member, and the members within the group may continue performing information interaction through the group conversation retained.

Further alternatively, step 14 includes the following substeps:

Firstly, a second preset operation executed by the current user on the target group associated with the team is received, and an association relation unbinding option configured to indicate unbinding of the association relation with the team is displayed.

Secondly, the association relation between the target group and the team is unbound according to a received selection operation executed the association relation unbinding option.

In these alternative implementations, an entry facilitating unbinding of the association relation between the target group and the team is provided.

In some alternative implementations, the group type of the target group associated with the team is a first type of group; and the group type of the target group is set to a second type after the association relation between the target group and the team is unbound. The first type of group is a group associated with the team, and the second type of group is a group disassociated from the team.

In these alternative implementations, a plurality of groups of the current user may include the first type of group and the second type of group. The first type of group may be the group associated with the team. The second type of group may be the group disassociated from the team currently. After the association relation between the first type of group and the team is unbound, the group type may be changed from the first type to the second type. In addition, after the second type of group is associated with the team, the group type may be changed from the second type to the first type.

In some alternative implementations, the method for information interaction further includes: in response to determining that an information stream of non-team information is displayed on the information interaction interface, information of the first type of group is displayed in the information stream displayed on the interaction interface. The information of the first type of group includes team association information, and the team association information is configured to indicate that the group is associated with the team.

In these alternative implementations, the user may select to display team interaction information on the information interaction interface. Information of at least a part of groups associated with the team may be displayed in the team interaction information. In addition, the user may also select to display an information stream corresponding to a screening tag other than the team screening tag on the information interaction interface. For example, information stream(s) of individual chat information and/or group chat information are/is displayed. Information of the first type of group may also be displayed on the information interaction interface. The information of the first type of group includes the team association information. The team association information is configured to indicate that the first type of group is associated with the team. The team association information includes a team sub-identifier.

In this way, a latest message of the group associated with the team may also be browsed on the information interaction interface displaying an information stream of non-team information, so that a channel for noticing the new message is expanded. Moreover, the group may be rapidly identified as the first type of group or the second type of group depending on whether the group carries the team association information.

Further alternatively, on the information interaction interface of the information stream of the non-team information, the displayed information of the first type of group includes a team entry. The method for information interaction further includes: an information interaction interface of a team associated with the first type of group is entered according to a selection operation executed by the user on a team entry of the first type of group.

In these alternative implementations, a team entry of each first type of group may be displayed in a display area of the information of the first type of group. The team entry may be displayed as a graphic, text, etc.

The user may execute a selection operation on a team entry of one first type of group. After the selection operation executed by the user on the team entry, the information interaction interface of the team associated with the first type of group may be entered. That is, the information interaction interface is switched from displaying the information stream of the non-team information to displaying the team interaction information.

In these alternative implementations, the team entry is provided in the first type of group, so that the user enters the team interaction information from the information stream of the non-team information. For example, by providing the team entry in the information stream of the non-team information through the group associated with the team, the user may rapidly switch to an information display page or area where the corresponding team is positioned through the entry conveniently.

In some alternative implementations, the at least one group includes a first group, the first group is automatically generated as the team is created, and a group member set of the first group is the same as the team member set; and a group member of the first group is changed synchronously as the team member set is changed, so as to keep consistent with the team member set.

The step that a group member of the first group is changed synchronously as the team member set is changed includes the following: when being added to the team member set, a new team member is correspondingly added to the group member set of the first group as a group member; and when being deleted from the team member set, an existing team member is also deleted from the group member set of the first group simultaneously.

In this way, the group member set of the first group can keep consistent with the team member set.

In some alternative implementations, the first group is configured to send a notification message about a team-level event of the team, or a notification message related to the team. The notification message about a team-level event of a team includes one or more of the following: a notification message of new team creation; a notification message of a team information change event; a notification message of team member permission modification; a notification message of establishment of an association relation between the existing group and the team; a notification message of a team member change; and a notification message of team dissolution.

The notification message of new team creation may be a notification message created by the team. The notification message of a team information change event includes, but is not limited to, a team identifier change of the team, a team name change, and a team introduction information change. The notification message of a team member change includes a notification message of team member addition or subtraction.

In these alternative implementations, the system-level notification message may be sent in the first group. The user may browse these system-level messages in the first group. Moreover, the group member set of the first group is consistent with the team member set, so that the member of the team may browse these system-level notification messages from the messages of the first group. Therefore, the system-level messages may be transmitted to all the members of the team.

If a new system-level message exists in the first group, the first group may not be displayed at the top.

In some alternative implementations, the first group is automatically generated as the team is created.

In these alternative implementations, the first group above may be generated simultaneously while the team is created. In this way, the team member may receive a system notification message in the first group at the first time.

Further alternatively, the method includes one or more of the following: no association relation unbinding entry configured to unbind the association relation between the first group and the team is provided during the presence of the team; and no group dissolution entry configured to dissolve the first group is provided during the presence of the team.

In these alternative implementations, the method for information interaction further includes: the first group is dissolved or the first group is changed from the first type to the second type after the team is dissolved. The first type of group is a group associated with the team, and the second type of group is a group disassociated from the team.

In these alternative implementations, after the team is dissolved, the first group may be dissolved, or the group type of the first group may be changed as the first type of group associated with the team is changed to the second type of group disassociated from the team.

In these alternative implementations, the association relation between the first group and the team cannot be unbound, and the first group cannot be dissolved during the presence of the team. Accordingly, the member of the team can obtain the notification message through the first group during the presence of the team.

In some alternative implementations, the at least one group includes at least one second group, a group member set of the second group is the same as the team member set, the second group is created based on the team member set after the team is created, or, the second group is associated with the team after being created.

In these alternative implementations, the second group may be created after the team is created. For example, after the team is created, group creation is selected in a team setting page. After a selection operation on the group creation is received, the group creation window is displayed. The group creation window may display the team member set. The team member set may be selected as a group member set of the second group to create the second group. It can be understood that one or more second groups above may be provided. Each second group may include one group identifier. The group identifier may include, but is not limited to, text, a symbol, a graphic and/or a picture.

In some application scenarios, the second group may also be created outside the team. Alternatively, the second group is the existing group. In these application scenarios, the second group may be associated with the team according to an association relation between the second group created by the user and the team. When the second group is associated with the team, a non-team member among the group members of the second group may be removed from the second group, and the non-group member among the members of the team may be added as a group member of the second group simultaneously. Accordingly, the group member set of the second group is consistent with the team member set.

Further alternatively, the group member set of the second group is changed synchronously as the group member set is changed; and the team member set is changed synchronously as the group member set of the second group is changed.

That is, the group member of the second group and the team member are bi-directionally linked to ensure that the team member set is consistent with the group member set of the second group.

The second group may be, for example, a project progress communication group configured to publicize the progress of a certain development project. Alternatively, the second group may be a gourmet food information communication group.

In some alternative implementations, the method further includes: the first reminding mode is used as a message reminding mode of the at least one second group by default, and the message reminding frequency corresponding to the first reminding mode is lower than the preset reminding threshold.

The reminding threshold may be 1 time/day, etc. The preset reminding threshold may be set according to a specific application scenario, which will not be limited herein. Illustratively, the first reminding mode herein is, for example, a reminding mode of turning off a message notification.

In the case of turning off the message notification, when the group receives a new message, prompt information indicating that the new message is received may not be sent to the user. When selecting to browse the message of the group, the user may browse an unread message.

In these alternative implementations, the first reminding mode is used in the at least some groups by default. The interference to the user by reminding the user of the new message when the second group receives the new message may be reduced.

Further alternatively, the method for information interaction further includes the following: the first reminding mode is changed to a second reminding mode according to a change operation on the message reminding mode by the current user who logs in the information interaction interface. A message reminding frequency of the second reminding mode is higher than that corresponding to the first reminding mode.

Illustratively, the second reminding mode herein is, for example, a reminding mode of opening a message notification. That is, the current user may change the reminding mode of the second group, and the message reminding mode of the second group may be set by the user.

In some alternative implementations, the at least one group includes at least one third group, and a group member set of the third group is a proper sub-set of the team member set; the third group is created based on the team member set after the team is created, or, the third group is associated with the team after being created; and identifier information of the third group is visible to a team member other than a third group member.

Further, a message within the third group is invisible to a member of the team other than a member of the third group.

In these alternative implementations, a group member of the third group may be the team member. A part of members of the team may not be the group members of the third group. The member of the team may browse the identifier information of the third group on the information interaction interface of the team. But the member of the team cannot see the message within the third group. That is, the user may perceive the presence of the third group, but cannot see the message within the third group.

The message within the third group cannot be leaked while the user can know the team information.

In some alternative implementations, the at least one group includes at least one fourth group, and a group member set of the fourth group is a proper sub-set of the team member set; the fourth group is created based on the team member set after the team is created, or, the fourth group is associated with the team after being created; and identifier information of the fourth group is invisible to a member of team other than a member of the fourth group.

In these alternative implementations, the member of the team other than the member of the fourth group cannot perceive the presence of the fourth group, so that the privacy of a message within the fourth group can be ensured. The fourth group may be configured for information communication with high confidentiality.

In some alternative implementations, the group has a first group management function set before the association relation with the team is established or after the association relation with the team is unbound, and the group has a second group management function set after the association relation with the team is established. The second group management function set has fewer management functions than the first group management function set.

Further, when the second group management function set has fewer management functions than the first group management function set, the method for information interaction further includes the following: at least one management function of the first group management function set is merged into at least one management function of the team or added to a management function set of the team after the association relation between the group and the team is established; and the first group management function set is processed to obtain the second group management function set by: deleting the at least one management function, or setting the at least one management function of the first group to a disabled state.

Further alternatively, the step that at least one management function of the first group management function set is merged into at least one management function of the team includes the following: objects managed by the at least one first management function of the team are expanded to encompass the first group. A transaction management range of the at least one first management function of the team may cover a transaction management range covered by a merged management function in the first group management function set.

In these alternative implementations, by merging a first management function of the first group with the first management function of the team, a merged first management function servers as a management function of the team. In addition, some original group management functions of the first group may also be added to a group management function of the team, so as to become a management function of the team.

The first management function may be, for example, a group deletion function of the first group. The group management function added to the group management function of the team may be, for example, a group member addition or deletion management function of the first group and the second group.

In these alternative implementations, by merging the management function of the group and the management function of the team into the management function of the team, or adding some management functions of the group to the management function of the group, the management function of the team is required to manage the group through the above management function. Accordingly, the group can be controlled, and the information of the group cannot be leaked.

Figure 2:
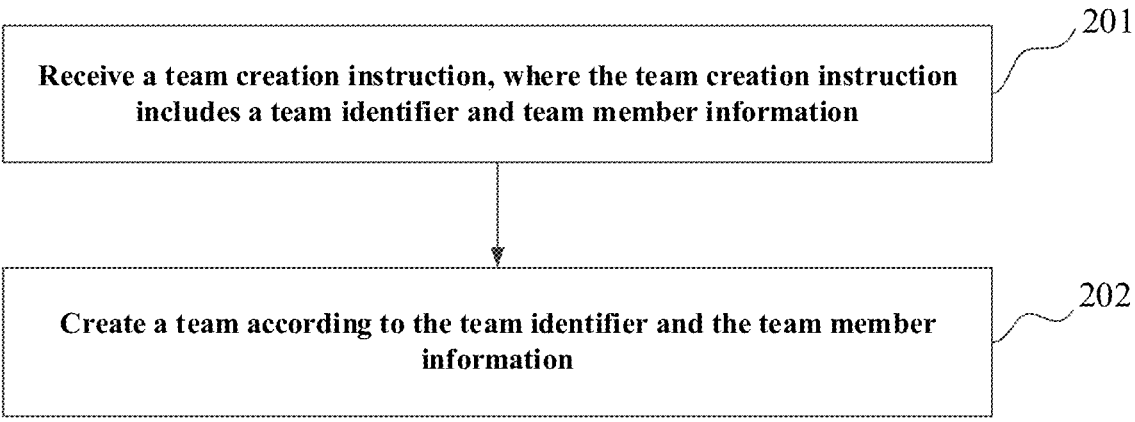
FIG. 2 is a schematic flowchart of creating a team in the embodiment shown in FIG. 1.

With reference to FIG. 2, a schematic flowchart of creating a team in the embodiment shown in FIG. 1 is shown in FIG. 2.

As shown in FIG. 2, the team is created based on the following steps:

Step 201, a team creation instruction is received, where the team creation instruction includes a team identifier and team member information.

The team creation instruction may be sent by a user in a preset team creation window. The team creation instruction includes the team identifier and the team member information. The team identifier includes, but is not limited to, text, a graphic, a symbol, and/or a picture, etc. The team member information may include a team member set. The team member set may include at least one team member.

Further, the step 201 may include the following:

Sub-step 2011: the team creation window is displayed according to a team creation operation initiated by the user, where the team creation window includes a team name information input window and a team member setting window.

A team creation option configured to indicate team creation may be included in an information interaction interface. It may be deemed that the user initiates the team creation operation when a selection operation is executed by the user on the team creation option. The team creation window may be displayed according to the team creation operation.

Sub-step 2012: a team name input by a preset user in the team name information input window is received.

Sub-step 2013; team member information of a team to be created that is set by the user in the team member setting window is received.

The step that team member information is set may include the following: the team member information is input in the team member setting window, or, a team member is selected from a candidate team member list displayed in the team member setting window.

The candidate team member may be contact of the user, or another user pushed by a server.

The team identifier and the team member information included in the team creation instruction may be received by sub-steps 2011-2013.

Step 202: the team is created according to the team identifier and the team member information.

One new team may be created through steps 201-202. A plurality of team members in the team may not belong to the same group before the team is created.

After the team is created, a first group in the team is automatically generated. A group member set of the first group is consistent with a team member set of the team.

In addition, after the team is created, a second group, a third group, a fourth group, etc. associated with the team may be generated based on the team members.

Reference is made to the descriptions of the first group, the second group, the third group, and the fourth group for details, which will not be repeated herein.

The team is newly created in the manner shown in FIG. 2.

In some other embodiments, the team in the embodiment shown in FIG. 1 is generated based on the following steps: according to a preset group attribute change operation executed by the user on an existing group, the team is generated based on information of the existing group.

The above preset group attribute change operation is configured to instruct to change the existing group from a group attribute to a team attribute.

In these alternative implementations, the existing group may be upgraded to the team through an attribute change.

For example, the step that the team is generated based on information of the existing group includes the following: an existing group member set is taken as the team member set to generate the team to generate the team; and the existing group is changed to a group associated with the team.

That is, when the existing group is upgraded to the team, the group member set of the existing group may be taken as the team member set to generate the team. The team identifier of the team may be the same as a group identifier of the existing group. In addition, the existing group may be changed to the group associated with the team.

Team creation methods are expanded by upgrading the group to the team.

In some alternative implementations, a default pattern of the team identifier of the team created according to the embodiment shown in FIG. 2 differs from a default pattern of a group identifier.

In these alternative implementations, the team may be a team created according to the team creation instruction or the team obtained by changing the group to the team through the group attribute change.

In these alternative implementations, the default pattern of the team identifier of the created team differs from the default pattern of the group identifier of the group.

The pattern of the team identifier or the group identifier includes, but is not limited to, at least one of the following: a graphic, an image, and a background color.

By setting the default pattern of the team identifier and the default pattern of the group identifier differently, the user can rapidly identify whether one identifier is the team identifier or the group identifier through the pattern.

In some alternative implementations, the above method for information interaction further includes the following:

Firstly, a team identifier pattern editing entry is displayed.

The team identifier pattern editing entry may be displayed in a team creation page for team creation or entered through a team setting entry. Reference can be made to relevant parts of the description for the display of the team setting entry, which will not be repeated herein.

Secondly, a team identifier pattern editing item is displayed according to a received triggering operation executed on the pattern editing entry.

The team identifier pattern editing item includes, but is not limited to, at least one of the following: a graphic or image input item, a text input item, a text color setting item, and a background color setting item.

Finally, a team identifier pattern is determined according to a pattern editing operation executed by the user on the team identifier pattern editing item.

In these alternative implementations, the user may edit the team identifier pattern, so that the team identifier is personalized.

In some alternative implementations, the team setting entry further includes a team member change entry. The method for information interaction further includes:

A team member change page is displayed according to a triggering operation executed by the user on the team member change entry; and a new team member added through the team member change page is added to the team member, or, a team member deleted through the team member change page is removed from the team member set.

Illustratively, the team member change entry may be a team member addition entry. The user may click the team member addition entry, so as to display the team member change page. The team member change page may be a team member addition page. The user may execute a team member addition operation in the team member addition page. For example, a target contact is selected from a plurality of contacts as a team member to be added, and the team member to be added is added to the team member set.

Further illustratively, the team member change entry may also be a team member deletion entry. The user may click the team member deletion entry, so as to display a team member deletion page. All team members may be displayed in the team member deletion page. The user may determine a target team member to be deleted through a selection operation, and remove the target team member from the team member set according to sub sequent operations.

As another schematic illustration, the team member change page is entered through the team member change entry, and the team member change page provides a team member addition option and a team member deletion option. A new team member is added to the team by executing a corresponding operation on the team member addition option. A selected team member is removed from the team member set by executing a corresponding operation on the team member deletion option.

In some application scenarios, the team setting entry may further include a team quitting entry, a team dissolution entry, and a team management entry.

A team quitting page for quitting the team may be entered through the team quitting entry. The team is quit through a corresponding operation executed on the team quitting page.

A team dissolution page for dissolving the team may be entered through the team dissolution entry. The team is dissolved through a corresponding operation executed on the team dissolution page.

The team management page configured to manage the team may be entered through the team management entry. In these application scenarios, the user who logs in the information interaction interface may be a user having management permission among the members of the team. The user may manage the permission of the member of the team through the team management page.

In some alternative implementations, the method for information interaction further include the following: in response to receiving a request of a first user to get out of the members of the team, the first user is removed from the team and the group associated with the team.

In these alternative implementations, the user may apply to get out of the team. The first user who has applied to get out of the team may be removed from the team member set according to the application from the user. The first user is removed from a group set of the group associated with the team simultaneously. In this way, the first user may successfully get out of the team. The user is provided with a convenient way to get out of the team through such an implementation.

In some alternative implementations, the method for information interaction further includes: an association relation between the team and each associated group is unbound according to a received instruction to dissolve the team.

In these alternative implementations, the association relation between the team and each associated group may be unbound according to the instruction to dissolve the team. Each group may be changed from a first type of group associated with the team to a second type of group disassociated from the team. Group data of each group may be retained, and an information interaction function within the group may also be retained.

A way to dissolve the team is provided through these alternative implementations, so that the user can manage the team.

In some alternative implementations, the at least one group includes the first group and other groups, where the first group is configured to send a team-level system notification message. The method for information interaction further includes the following:

Firstly, a corresponding notification message is sent in the first group in response to occurrence of a team-level event.

Secondly, a corresponding notification message is sent in a corresponding group in response to occurrence of a group-level event, and a corresponding notification message is sent in the first group when the group-level event satisfies a first predetermined condition.

In some alternative implementations, the team-level event includes: a team information change event. A team information change includes, but is not limited to, a team name change, a team identifier change, a team member change, a team-associated group change, a team introduction information change, etc. These team-level events may be sent in the first group as system-level system notification messages. When selecting to browse the message of the first group, the user may browse each system notification message in sequence.

In addition, a corresponding notification message may be sent in a corresponding group for the occurrence of the group-level event. For example, other groups may include a fourth group with high privacy. For the group-level event, for example, a group member in the fourth group may send a message in the fourth group. The message may be sent in the fourth group to the group member of the fourth group.

The first predetermined condition may be, for example, a group member change, a group identifier change, etc.

In some alternative implementations, the method for information interaction further includes: in response to determining that a notification message satisfies a second predetermined condition, the group sending the notification message is placed at the top in a conversation stream.

Further, the second predetermined condition includes at least one of the following: the notification message is a notification message of new team creation; the notification message is a notification message of a team information change; the notification message is a notification message of association between the existing group and the team; and the notification message is a notification message of team dissolution.

In these alternative implementations, the message satisfying the second predetermined condition may be deemed as a significant message. After the important messages are received, the group sending the notification message may be placed at the top in the conversation stream, so that the user can rapidly browse through the important messages. In an embodiment, a group configured to present the team-level system notification message may be a default group automatically generated as the team is created.

In some alternative implementations of this embodiment, the method for information interaction further includes: at least one another information communication entity associated with the team indicated by the team identifier is displayed, where the at least one another information communication entity includes one or more of the following: a document, a calendar, and a conference.

In these alternative implementations, the team is also associated with other information communication entities other than the group. The user may browse information carried by other communication entities in the team conveniently.

In some embodiments, by selecting a user set, for example, selecting a group of people, the selected user set is determined as the team member set of the team to create the team. The information and permission boundaries may be established for the team through the team member set, so that the information and permission boundaries of the team are relatively stable. One or more information communication entities of the same type or different types may be mounted or associated under the team. The team members perform information interaction through the information communication entities, so as to keep the information transparent within the team to a maximum extent. In some embodiments, information communication permission within the team is controlled based on the team member set. In other words, reference is also made to team member set information of the team when information interaction permission within the information communication entity is controlled. Accordingly, the problem that the information is not transparent because the information within the information communication entity can only be spread within the information communication entity, for example, the problem that the information is not transparent because the a group message can only be viewed within the group only, can be avoided. Alternatively, the risk of leakage caused by a too loose information spreading condition of the information communication entity can be avoided.

In some embodiments, with the aid of preset notification logic, the team member is not excessively disturbed while the information transparency within the team is improved. For example, in a default communication group associated with the team, only the message satisfying the predetermined condition is notified within the default communication group. Alternatively, the first notification mode is used for information related to the team, and the second notification mode is used for a message not directly related to the team or within the information communication entity of the team. The first notification mode has higher notification intensity than the second notification mode. In some embodiments, the team member may also actively increase the message notification intensity of one or more information communication entities, so that the team member actively notices the information.

Figure 3:
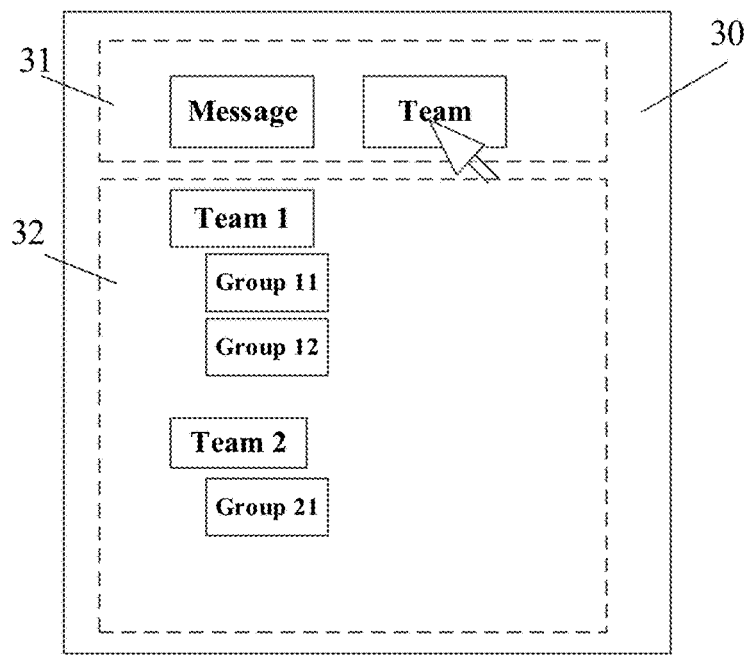
FIG. 3 is a schematic diagram of an application scenario of a method for information interaction according to an embodiment of this disclosure.

With reference to FIG. 3, a schematic diagram of an application scenario according to this embodiment is shown in FIG. 3. As shown in FIG. 3, a plurality of screening tags may be displayed on an information interaction interface 30. For example, a message screening tag "message" and a team screening tag "team" are displayed in a first area 31 of the information interaction interface 30. The user may execute a selection operation on the team screening tag "team". Accordingly, team information of a plurality of teams associated with the team screening tag is displayed in a second area 32 of the information interaction interface. For example, a team identifier of team 1 and a team identifier of team 2 may be displayed in the second area 32. At least one group associated with the team may be displayed in the second area 32 for the information. For example, group 11 and group 12 associated with team 1, and group 21 associated with team 2 are displayed.

Also, the user may also execute a team creation operation and a team deletion operation in the second area.

With team 1 as an example, the above team 1 may have a team member set, group 11 may have a group member set 111, and group 12 may have a group member set 121. Group 11 may be a first group created when team 1 is created. The group member set 111 of group 11 and the team member set are consistent with each other and bi-directionally linked. A team-level system message of team 1 may be sent in group 11. Also, a message satisfying a first predetermined condition within group 11 may also be sent in group 11. The group member set of group 12 may also be a sub-set of team 1. Group 12 may be a second group, a third group, etc.

The user may add group member q to group 12. When adding group member q to group 12, the user may add group member q as a team member simultaneously.

Also, the user may also select to associate existing group s with team 1 on the information interaction interface 30. When the existing group s is associated with team 1, group members f not belonging to team 1 in the existing group s may be deleted from the group member set, and then the existing group s with a non-team member removed is associated with the team. Alternatively, when the existing group s is associated with team 1, the user is asked whether to agree to add group member f not belonging to team 1 in the existing group s as a team member; and after the user confirms the agreement, the group member f is added as the team member, and the existing group s is associated with the team.

With reference to FIG. 4, a flowchart of some embodiments of a method for information interaction according to this embodiment is shown in FIG. 4. As shown in FIG. 4, the method for information interaction includes the following:

Step 401, a team identifier is displayed on an information interaction interface, where a team indicated by the team identifier has an associated team member set, the team is associated with at least one type of information communication entity, and the information communication entity is configured for information interaction among team members.

At least one type of information communication entity includes one or more of the following: a group, a calendar, a document, and a conference.

That is, the team may be associated with the group, the calendar, the document, and/or the conference.

The information communication entity may be configured for the information interaction among the team members. The team member may be associated with the team member set.

Step 402, information interaction permission in the information communication entity is controlled based on the team member set of the team.

For example, the information interaction in the information communication entity may be limited to be performed only among the team members. A non-team member does not perform information interaction with the information communication entity associated with the team.

In some alternative implementations, the step that information interaction permission in the information communication entity is controlled includes the following: the information interaction permission in the information communication entity is controlled based on a first permission system of the team and a second permission system of the information communication entity.

The first permission system includes, but is not limited to, a team management function set of the team, such as team member addition or subtraction and information spreading condition. The second permission system includes, but is not limited to, a management function set of the information communication entity, such as member addition or subtraction within the information communication entity, member permission, and an information spreading condition.

The group may be managed through the management function set of the team, so that the information interaction permission in the information communication entity is controlled.

Further alternatively, the step that the information interaction permission in the information communication entity is controlled based on a first permission system of the team and a second permission system of the information communication entity includes the following: at least one original management function of the information communication entity before the information communication entity is associated with the team is added to a management function set of the team, or, at least one original management function is merged with a management function of the team; and the at least one management function is deleted from a management function set of the information communication entity, or, the at least one management function is set to a disabled state.

With the communication entity serving as a group as an example, after an association relation between the group and the team is created, at least one original management function of the group after the association relation with the team is created is merged into at least one management function of the team or added to a management function set of the team; and the first group management function set is processed as follows to obtain the second group management function set: the at least one management function is deleted, or, the at least one management function of the first group is set to a disabled state.

The step that at least one management function of the first group management function set is merged into at least one management function of the team includes: objects managed through the at least one first management function of the team are expanded to encompass the first group. A transaction management range of the at least one first management function of the team may cover a transaction management range covered by a merged management function in the first group management function set.

For example, a team dissolution function is expanded to cover a group dissolution function.

By merging the management function of the information communication entity and the management function of the team into the management function of the team, or adding some management functions of the group of the information communication entity to the management function of the group, the management function of the team is required to manage the group through the above management function. Accordingly, the information communication entity can be controlled, and information carried by the information communication entity cannot be leaked.

In some other application scenarios, the information communication entity includes an instant message communication group. The step that information interaction permission in the information communication entity is controlled includes the following: a change of the team member set is linked with a change of a member set of at least one associated instant message communication group.

In these alternative implementations, an information communication group is associated with a group member set. The group member set may be a sub-set of the team member set.

The change of the team member set is linked with the change of the group member of the at least one associated instant message communication group. Accordingly, the information interaction permission in the information communication entity is controlled.

For example, the group member set of the instant message communication group is changed synchronously as the group member set is changed; and the team member set is changed synchronously as the group member set of the instant message communication group is changed.

When being added to the team member set, a new team member is correspondingly added to the group member set of the instant message communication group as a group member. When being deleted from the team member set, an existing group member is also deleted from the group member set of the instant message communication group simultaneously. If being added to the group member set of the instant message communication group, a new group member is also added to the team member set. If being deleted from the group member set of the instant message communication group, a group member deleted from the group is also deleted from the team member set.

By linking the change of the team member set with the change of the group member set of the instant message communication group, the team member set may be kept consistent with the group member set of the instant message communication group, and the team member may browse a communication message of the instant message communication group at any time. Therefore, the communication message in the instant message communication group is limited to be visible by the team member, and the security of the communication message of the instant message communication group can be improved.

In some alternative implementations, the information communication entity includes a default information communication entity, where the default information communication entity is generated simultaneously when the team is created.

The information communication entity herein includes, but is not limited to, a group, a calendar, a document, and a conference. The conference includes communication channels such as real-time or non-real-time voice and/or video conferences, including a voice chat room, real-time voice or a video conference, a direct broadcasting room, etc.

In these alternative implementations, the default information communication entity is generated simultaneously when the team is created. Accordingly, communication information of the team member can be carried by the default information communication entity when the team is created.

In the related art, an instant messaging application is used as a principal tool for collaborative work, and various information required to advance work is distributed in various group chats and cloud documents. Information in the group chat may be updated in real time, and group chat information updated in real time disturbs a user. Therefore, for the user, it is desirable to balance "information transparency+low interference", that is, "the user wants to know the information, but worries about being excessively disturbed by notification of all the information".

In the method for information interaction according to this embodiment, the team identifier is displayed on the information interaction interface, where the team indicated by the team identifier has the associated team member set, the team is associated with at least one type of information communication entity, and the information communication entity is configured for information interaction between the team members; and the information interaction permission in the information communication entity is controlled based on the team member set of the team, so that communication of the message within the team is performed within the team member set. Accordingly, the interference to the non-team member can be reduced, the team member can know the information carried by the information communication entity within the team in real time, and the information transparency within the team is realized. The information transparency can be improved while the information interference can be reduced to a certain extent.

Figure 5:
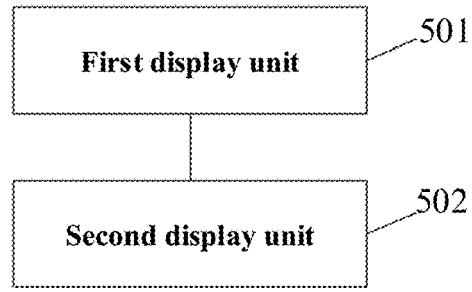
FIG. 5 is a schematic structural diagram of an apparatus for information interaction according to an embodiment of this disclosure.

Further, with reference to FIG. 5, which serves as an implementation of the method shown in each figure above, this disclosure provides an embodiment of an apparatus for information interaction. The apparatus embodiment corresponds to the method embodiment shown in FIG. 1, and the apparatus may be specifically applied to various electronic devices.

As shown in FIG. 5, the apparatus for information interaction in the embodiment includes: a first display unit 501 and a second display unit 502. The first display unit 501 includes configured to display a team identifier on an information interaction interface, where a team indicated by the team identifier has an associated team member set; and the second display unit 502 is configured to display at least one group associated with the team indicated by the team identifier, where a group of the at least one group at least includes at least a part of members of the team member set.

In this embodiment, reference may be made to the related description of step 101 and step 102 in the corresponding embodiment in FIG. 1 respectively for specific processing and resulting technical effects of the first display unit 501 and the second display unit 502 of the apparatus for information interaction, which will not be repeated herein.

In some alternative implementations, the apparatus for information interaction further includes a screening identifier change unit (not shown in the figure). The screening identifier change unit is configured to receive a change operation executed by a user on at least one target conversation, where the change operation is configured to change a screening identifier corresponding to the target conversation; and change the screening identifier corresponding to the at least one target conversation to a first target screening identifier indicated by the change operation.

In some alternative implementations, a group member set of the at least one group is consistent with the team member set; or, the at least one group includes a group of which a group member set is consistent with the team member set, and a group of which a group member set is a proper sub-set of the team member set; or, the at least one group includes:

a group of which a group member set is a sub-set the team member set, and a group of which a group member set includes at least at least part of members in the team member set and a non-team member.

In some alternative implementations, the at least one group displayed is a group for which a current user who logs in the information interaction interface has viewing permission; and the group for which a current user has viewing permission includes: a group in which the current user is a group member, and a group in which the current user is not a group member but providing viewing permission to the current user.

In some alternative implementations, a part of the at least one group is invisible to a user who does not have viewing permission.

In these alternative implementations, a first reminding mode is used as a message reminding mode of some groups of the at least one group by default. A group member set of the part of the at least one group is consistent with the team member set, and a message reminding frequency corresponding to the first reminding mode is lower than a preset reminding threshold.

In some alternative implementations, the apparatus for information interaction further includes a message notification attribute change unit (not shown in the figure). The message notification attribute change unit is configured to change the first reminding mode to a second reminding mode according to a change operation executed by the current user who logs in the information interaction interface on the message reminding mode. A message reminding frequency of the second reminding mode is higher than that corresponding to the first reminding mode.

In some alternative implementations, an editing operation is performable on an association relation between the part of the at least one group and the team, and the association relation between the group and the team is changed through the editing operation.

In some alternative implementations, the editing operation includes: association relation establishment and/or association relation unbinding.

In these alternative implementations, the team identifier is displayed in a team information display area of the team, the editing operation includes the association relation establishment, and the apparatus for information interaction further includes: an association relation establishment unit (not shown in FIG. 5). The association relation establishment unit is configured to establish the association relation between the group and the team based on the following steps: receive a first preset operation executed by the current user on the team information display area, and display a group addition option configured to indicate addition of the group associated with the team; display a group addition window according to a received selection operation executed on the group addition option; and associate a target group with the team indicated by the team identifier according to a target group determination operation executed by the user on the group addition window.

In some alternative implementations, the target group determination operation may include: existing group selection, and/or group creation.

In some alternative implementations, the association relation establishment unit is further configured to determine a type of the target group according to a group type setting operation executed by the user on the target group.

The group type setting operation executed on the target group includes: a selection operation executed by the user on at least one candidate group type option displayed; or, a group type input operation executed by the user on the target group.

In some alternative implementations, the group addition option includes: an existing group addition option. The association relation establishment unit is further configured to display an existing group list according to a received selection operation executed on the existing group addition option, where the existing group list includes at least one existing group; and associate the target group with the team indicated by the team identifier according to the target group determination operation executed by the user on the group addition window, which includes: at least one target group is determined according to the selection operation executed by the user on the existing group list, and the association relation between the target group and the team is established.

In some alternative implementations, the association relation establishment unit is further configured to remove, in response to determining that the target group comprises a non-team group member other than the members of the team, the non-team group member from the target group, and obtain a first target group; establish an association relation between the first target group with the non-team member removed and the team; or, display inquiry information about whether to add a non-team group member as a team member, establish an association relation between the target group and the team in response to a confirmation operation made by the current user based on the inquiry information, and add the non-team member to the team; add, in response to determining that the members of the team comprise a non-group member other than members of the target group, the non-group member to a group member set of the first target group, and obtain a second target group; and establish an association relation between the second target group and the team.

In some alternative implementations, the existing group list includes: a first type of group in which the current user is a group owner or a group administrator; or, a first type of group in which the current user is a group owner or a group administrator, and a second type of group in which the current user is a group member but not a group owner or a group administrator.

In some alternative implementations, the association relation establishment unit is further configured to, upon determining that the existing group list includes the second type of group in which the current user is the group member but not the group owner or the group administrator, send a request message to the group owner or the administrator of the second type of group upon the user executing a selection operation on the second type of group in the existing group list, where the request message is configured to request to associate the second type of group with the team; and determine the second type of group determined as the target group in response to confirmation information of agreeing to associate the second type of group with the team.

In some alternative implementations, the group addition option includes a new group creation window. The association relation establishment unit is further configured to display the group creation window configured to create a group according to the received selection operation on the new group creation option, where the group creation window includes a candidate group member list; and associate the target group with the team indicated by the team identifier according to the target group determination operation executed by the user on the group addition window, which includes: determining a new group member according to a selection operation executed by the user on the candidate group member list; and creating a new group comprising the new group member, and associating the new group with the team.

In some alternative implementations, the candidate group member list includes a team member list and/or a non-team member list.

In some alternative implementations, the first display unit 501 is further configured to display a team screening tag on the information interaction interface; and display at least one team identifier on the information interaction interface when the team screening tag is selected.

In some alternative implementations, the first display unit 501 is further configured to display information of the group associated with the team indicated by the at least one team identifier in a conversation stream on the information interaction interface upon determining that the team screening tag is selected; and display information of the group associated with the team in a conversation stream displayed on the information interaction interface upon determining that a screening tag other than the team screening tag on the information interaction interface is selected; where the conversation stream is configured to display individual conversation information and group conversation information.

In some alternative implementations, upon determining that the screening tag other than the team screening tag on the information interaction interface is selected, the information of the group associated with the team displayed in the conversation stream includes a team indication identifier, where the team indication identifier is configured to indicate that the group is associated with the team.

In some alternative implementations, the team indication identifier includes a first indication identifier configured to indicate the team associated with the group.

In some alternative implementations, the editing operation includes unbinding the association relation between the group and the team. The apparatus for information interaction further includes an association relation unbinding unit (not shown in FIG. 5). The association relation unbinding unit is configured to unbind the association relation between the group and the team based on the following: the association relation between the team and the target group is unbound and a target group conversation is retained according to a received target group association unbinding operation.

In some alternative implementations, the step that a target group conversation is retained includes the following: information of the target group is displayed on a group information display interface of the information interaction interface.

In some alternative implementations, the association relation unbinding unit is further configured to receive a second preset operation executed by the current user on the target group associated with the team, and display an association relation unbinding option configured to instruct to unbind the association relation with the team.

In some alternative implementations, a group type of the target group associated with the team is a first type of group. The apparatus for information interaction further includes a first type setting unit (now shown in FIG. 5). The first type setting unit is configured to set the group type of the target group to a second type after the association relation between the target group and the team is unbound. The first type of group is a group associated with the team, and the second type of group is a group disassociated from the team.

In some alternative implementations, information of the first type of group displayed on the information interaction interface of an information stream of non-team information includes a team entry. The second display unit 502 is further configured to enter an information interaction interface of a team associated with the first type of group according to a selection operation executed by the user on the team entry of the first type of group.

In some alternative implementations, the at least one group includes a first group, the first group is automatically generated as the team is created, and a group member set of the first group is the same as the team member set; and a group member of the first group is changed synchronously as the group member set is changed, so that the member of the first group is kept consistent with the member of the team member set.

In some alternative implementations, the first group is configured to send a system-level notification message about the team. The system-level notification message about the team includes any one or more of the following: a notification message of new team creation; a notification message of basic team information modification; a notification message of team member permission modification; a notification message of establishment of an association relation between the existing group and the team; a notification message of a team member change; and a notification message of team dissolution.

In some alternative implementations, the first group is automatically generated as the team is created.

In some alternative implementations, no association relation unbinding entry configured to unbind the association relation between the first group and the team is provided in the presence of the team; and no group dissolution entry configured to dissolve the first group is provided during the presence of the team.

In these alternative implementations, the apparatus for information interaction further includes a first type setting unit (not shown in FIG. 5). The first type setting unit is configured to dissolve the first group or change the first group from a first type to a second type after the team is dissolved. A group of the first type is a group associated with the team, and a group of the second type is a group disassociated from the team.

In some alternative implementations, the at least one group includes at least one second group, a group member set of the second group is consistent with the team member set, the second group is created based on the team member set after the team is created, or, the second group is associated with the team after being created.

In some alternative implementations, the group member set of the second group is changed synchronously as the group member set is changed; and the team member set is changed synchronously as the group member set of the second group is changed.

In some alternative implementations, a first reminding mode is used as a message reminding mode of the at least one second group by default, and a message reminding frequency corresponding to the first reminding mode is lower than a preset reminding threshold.

In some alternative implementations, the at least one group includes at least one third group, and a group member set of the third group is a proper sub-set of the team member set; the third group is created based on the team member set after the team is created, or, the third group is associated with the team after being created; and identifier information of the third group is visible to a member of the team other than a member of the third group.

In some alternative implementations, a message within the third group is invisible to the member of the team other than the member of the third group.

In some alternative implementations, the at least one group includes at least one fourth group, and a group member set of the fourth group is a proper sub-set of the team member set; the fourth group is created based on the team member set after the team is created, or, the fourth group is associated with the team after being created; and identifier information of the fourth group is invisible to a member of the team other than a member of the fourth group.

In some alternative implementations, the group has a first group management function set before the association relation with the team is established or after the association relation with the team is unbound, and the group has a second group management function set after the association relation with the team is established. The second group management function set has fewer management functions than the first group management function set.

In some alternative implementations, the apparatus for information interaction further includes a function management unit (not shown in FIG. 5). The function management unit is configured to merge at least one management function in the first group management function set into at least one management function of the team or add at least one management function in the first group management function set to a management function set of the team after the association relation between the group and the team is established when the second group management function set has fewer management functions than the first group management function set; and the first group management function set above is processed to obtain the second group management function set by: deleting the at least one management function, or setting the at least one management function of the first group to a disabled state.

In some alternative implementations, the function management unit is further configured to expand objects managed through the at least one first management function of the team to encompass the first group. A transaction management range of the at least one first management function of the team may cover a transaction management range covered by a merged management function in the first group management function set.

In some alternative implementations, the apparatus for information interaction further includes a team creation unit (not shown in FIG. 5). The team creation unit creates the team based on the following steps: a team creation instruction is received, where the team creation instruction includes a team identifier and team member information; and the team is created according to the team identifier and the team member information.

In some alternative implementations, the team creation unit is further configured to display the team creation window according to a team creation operation initiated by the user, where the team creation window includes a team name information input window and a team member setting window; receive a team name input by a preset user in the team name information input window; and receive team member information of a team to be created that is set by the user in the team member setting window.

In some alternative implementations, the team creation unit is further configured to generate the team based on the following steps: according to a preset group attribute change operation executed by the user on an existing group, the team is generated based on information of the existing group, where the preset group attribute change operation is configured to instruct to change the existing group from a group attribute to a team attribute.

In some alternative implementations, the team creation unit is further configured to generate the team by taking a member set of the existing group as the team member set; and change the existing group to the group associated with the team.

In some alternative implementations, a default pattern of the team identifier of the team differs from a default pattern of a group identifier.

In some alternative implementations, the apparatus for information interaction further includes a member change unit (not shown in FIG. 5). The member change unit is configured to remove, in response to receiving a request a request of a first user to get out of the members of the team, the first user from the team and the group associated with the team.

In some alternative implementations, the apparatus for information interaction further includes a team dissolution unit (not shown in FIG. 5). The team dissolution unit is configured to: unbind an association relation between the team and each associated group according to a received team dissolution instruction.

In some alternative implementations, the at least one group includes the first group and another group, where the first group is configured to send a team-level system notification message. The apparatus for information interaction further includes a message notification unit (not shown in FIG. 5). The message notification unit is configured to send a corresponding notification message in the first group in response to occurrence of a team-level event; send a corresponding notification message in a corresponding group in response to occurrence of a group-level event; and send a corresponding notification message in the first group upon determining that the group-level event satisfies a first predetermined condition.

In some alternative implementations, the message notification unit is further configured to place the group sending the notification message at the top of the conversation stream in response to determining that the notification message satisfies a second predetermined condition.

In some alternative implementations, the second predetermined condition includes at least one of the following: the notification message is the notification message of team creation; the notification message is the notification message of a team information change; the notification message is the notification message of association between the existing group and the team; and the notification message is the notification message of team dissolution.

In some alternative implementations, the team-level event includes: a team information change event. A team information change includes: a team name change, an identifier change, and a team introduction information change.

In some alternative implementations, the second display unit 502 is further configured to display at least one another information communication entity associated with the team indicated by the team identifier. The at least one another information communication entity includes one or more of the following: a document, a calendar, and a conference.

In some alternative implementations, the step of displaying a team identifier on an information interaction interface includes the following: the team identifier is displayed in the conversation stream on the information interaction interface. The second display unit 502 is further configured to display information of each associated group in the conversation stream next to the team identifier; or, display information of each associated group next to the team identifier in response to determining that the team identifier in the conversation stream is triggered.

In some alternative implementations, the team identifier is displayed in a first display sub-area of a team information display area. The team information display area further includes a second display sub-area, and the second display sub-area is configured to display an extension identifier. The second display unit 502 is further configured to: display a team setting entry in response to receiving a first triggering operation executed by the current user on the first display sub-area; or, display a team setting entry in response to receiving a second triggering operation executed by the current user on the second display sub-area; where the team setting entry includes an entry of an editing operation configured to edit an association relation between the group and the team.

In some alternative implementations, the team setting entry further includes a team member change entry. The team member change entry is further configured to: display a team member change page according to a triggering operation executed by the user on the team member change entry; and add a new team member added through the team member change page to the members of the team, or, remove a team member deleted through the team member change page from the team member set.

Figure 6:
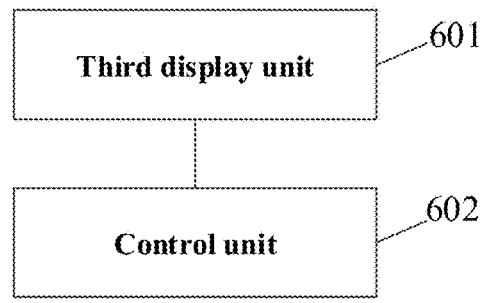
FIG. 6 is a schematic structural diagram of an apparatus for information interaction according to an embodiment of this disclosure.

Further, with reference to FIG. 6, which serves as an implementation of the method shown in each figure above, this disclosure provides an embodiment of an apparatus for information interaction. The apparatus embodiment corresponds to the method embodiment shown in FIG. 1, and the apparatus may be specifically applied to various electronic devices.

As shown in FIG. 6, the apparatus for information interaction in the embodiment includes: a third display unit 601 and a control unit 602. The third display unit 601 is configured to display a team identifier on an information interaction interface, where a team indicated by the team identifier has an associated team member set, the team is associated with at least one type of information communication entity, and the information communication entity is configured for information interaction among team members; and the control unit 602 is configured to control information interaction permission in the information communication entity based on the team member set of the team.

In this embodiment, reference can be made to the related description of steps 601 and step 602 in the corresponding embodiment in FIG. 3 respectively for specific processing and resulting technical effects of the third display unit 601 and the control unit 602 of the apparatus for information interaction, which will not be repeated herein.

In some alternative implementations, the control unit 602 is further configured to control the information interaction permission in the information communication entity based on a first permission system of the team and a second permission system of the information communication entity.

In some alternative implementations, the control unit 602 is further configured to add at least one original management function of the information communication entity before the information communication entity is associated with the team to a management function set of the team, or, merge at least one original management function with a management function of the team; and delete the at least one management function from a management function set of the information communication entity, or, set the at least one management function to a disabled state.

In some alternative implementations, the information communication entity includes an instant message communication group. The control unit 602 is further configured to control a change of the team member set to be linked with a change of a group member set of at least one associated instant message communication group.

In some alternative implementations, the information communication entity includes a default information communication entity, where the default information communication entity is generated simultaneously when the team is created.

In some alternative implementations, the information communication entity includes one or more of the following: a group, a calendar, a document, and a conference.

Figure 7:
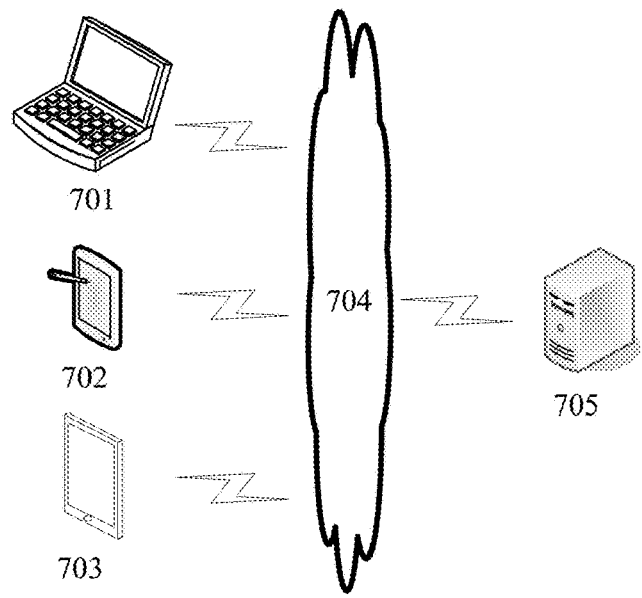
FIG. 7 is an illustrative system architecture to which a method for information interaction may be applied according to an embodiment of this disclosure.

With reference to FIG. 7, an illustrative system architecture to which an information interaction method can be applied in an embodiment of this disclosure is shown in FIG. 7.

As shown in FIG. 7, the system architecture may include terminals 701, 702, and 703, a network 704, and a server 705. The network 704 is configured to provide a communication link medium between the terminals 701, 702, and 703 and the server 705. The network 704 may employ various connection types, such as a wired communication link, a wireless communication link, or a fiber optic cable.

The terminals 701, 702, and 703 may interact with the server 705 through the network 704 to receive or send a message, etc. The terminals 701, 702, and 703 may be configured with various client applications, such as a web browser application, a search type application, and a news information type application. The client applications in the terminals 701, 702, and 703 may receive an instruction from a user and complete corresponding functions according to the instruction from the user. For example, an information stream of an instant messaging application is displayed according to the instruction from the user.

The terminals 701, 702, and 703 may be hardware or software. When being the hardware, the terminals 701, 702, and 703, which may be various electronic devices having display screens and supporting web browsing, include, but are not limited to, a smart phone, a tablet computer, an electronic book reader, a moving picture experts group audio layer III (MP3), a moving picture experts group audio layer IV (MP4), a laptop portable computer, a desktop computer, etc. When being the software, the terminals 701, 702, and 703 may be mounted in the electronic devices listed above. The terminals may be implemented as a plurality of pieces of software or a plurality of software modules (configured to provide distributed services, for example) or as single software or single software modules, which will not be limited specifically herein.

The server 705 may provide various services, such as receiving information sent by the terminals 701, 702, and 703 and forwarding the above information to other terminals.

It should be noted that the method for information interaction according to the embodiment of this disclosure may be executed by the terminals, and accordingly, the apparatus for information interaction may be configured in the terminals 701, 702, and 703. In addition, the method for information interaction according to this embodiment of this disclosure may also be executed by the server 705, and accordingly, the apparatus for information interaction may be configured in the server 705.

It should be understood that the numbers of the terminals, the network, and the server in FIG. 7 are merely schematic. Any numbers of terminals, networks, and servers may be provided as required in implementation.

Figure 8:
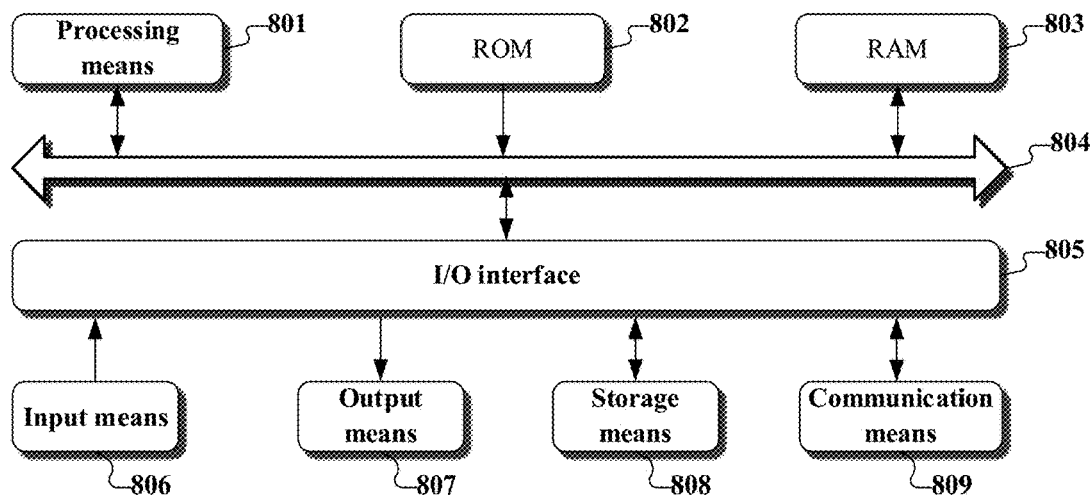
FIG. 8 is a schematic diagram of a basic structure of an electronic device according to an embodiment of this disclosure.

With reference to FIG. 8 below, a schematic structural diagram suitable for implementing an electronic device (for example, a terminal device or a server in FIG. 7) in an embodiment of this disclosure is shown in FIG. 8. The terminal device in this embodiment of this disclosure may include, but is not limited to, mobile terminals such as a mobile phone, a notebook computer, a digital broadcast receiver, a personal digital assistant (PDA), a pad, a portable multimedia player (PMP), an in-vehicle terminal (for example, an in-vehicle navigation terminal), and fixed terminals such as a digital television (TV) and a desktop computer. The electronic device shown in FIG. 8 is merely illustrative, and should not limit the functions and applicable scope in this embodiment of this disclosure in any way.

As shown in FIG. 8, the electronic device may include a processing means 801 (for example, a central processing unit or a graphic processor) that may execute various suitable actions and processing according to a program stored in a read-only memory (ROM) 802 or loaded into a random access memory (RAM) 803 from a storage means 808. The RAM 803 may also store various programs and data required for an operation of the electronic device 800. The processing means 801, the ROM 802, and the RAM 803 are connected to one another through a bus 804. An input/output (I/O) interface 805 is also connected to the bus 804.

Typically, the I/O interface 805 may be connected to the following apparatuses: an input means 806 such as a touch screen, a touch pad, a keyboard, a mouse, a camera, a microphone, an accelerometer, and a gyroscope; an output means 807 such as a liquid crystal display (LCD), a speaker, and a vibrator; a storage means 808 such as a magnetic tape and a hard disk; and a communication means 809. The communication means 809 may allow wireless or wired communication between the electronic device and other devices for data exchange. Although FIG. 8 shows the electronic device having various apparatuses, it should be understood that not all apparatuses shown are required to be implemented or configured. More or fewer apparatuses may be implemented or configured alternatively.

Particularly, the above processes described with reference to the flowcharts may be implemented as computer software programs according to the embodiment of this disclosure. For example, an embodiment of this disclosure includes a computer program product. The computer program product includes a computer program carried on a non-transitory computer-readable medium and encompassing program codes configured to execute the method shown in the flowchart. In such an embodiment, the computer program may be downloaded and mounted via a network through the communication means 809, mounted via the storage means 808, or mounted via the ROM 802. The computer program executes the above functions defined in the method in the embodiment of this disclosure when executed by the processing means 801.

It should be noted that the above computer-readable medium of this disclosure may be a computer-readable signal medium, a computer-readable storage medium, or any combination of the above. The computer-readable storage medium may include, but is not limited to, an electronic, magnetic, optical, electromagnetic, infrared, or semiconductor system, apparatus, or device, or any combination of the above. More specific instances of the computer-readable storage medium may include, but are not limited to, a portable computer magnetic disk, a hard disk, a random access memory (RAM), a read-only memory (ROM), an erasable programmable read-only memory (EPROM) or a flash memory, an optical fiber, a portable compact disk read-only memory (CD-ROM), an optical storage device, and a magnetic storage device that are each electrically connected through one or more wires, or any suitable combination of the above. In this disclosure, the computer-readable storage medium may be any tangible medium that encompasses or stores a program. The program may be used by or in connection with an instruction execution system, apparatus, or device. In this disclosure, however, the computer-readable signal medium may include a data signal propagating in a baseband or as part of a carrier wave, having computer-readable program codes carried thereon. Such a propagated data signal may take a variety of forms including, but not limited to, an electromagnetic signal, an optical signal, or any suitable combination of the above. The computer-readable signal medium which may also be any computer-readable medium other than the computer-readable storage medium, may send, propagate, or transmit a program to be used by or in connection with the instruction execution system, apparatus, or device. The program codes encompassed on the computer-readable medium may be transmitted via any suitable medium, including, but not limited to: a wire, an optic cable, a radio frequency (RF), etc., or any suitable combination of the above.

In some embodiments, clients and servers can communicate with each other via any currently known network protocol (such as a hypertext transfer protocol (HTTP)) or any network protocol to be developed in the future, and can be interconnected to any form or medium of digital data communication (for example, a communication network). Instances of the communication network include a local area network (LAN), a wide area network (WAN), the Internet, a peer-to-peer network (for example, an ad hoc peer-to-peer network), any currently known network, or any network to be developed in the future.

The above computer-readable medium may be encompassed in the above electronic device, or exist alone without being assembled into the electronic device.

The above computer-readable medium carries one or more programs. When executed by the electronic device, the above one or more programs cause the electronic device to display a team identifier on an information interaction interface, where a team indicated by the team identifier has an associated team member set; and display at least one group associated with the team indicated by the team identifier, where a group of the at least one group at least includes a part of members of the team member set. Alternatively, The above one or more programs cause the electronic device to display a team identifier on an information interaction interface, where a team indicated by the team identifier has an associated team member set, the team is associated with at least one type of information communication entity, and the information communication entity is configured for information interaction among team members; and control information interaction permission in the information communication entity based on the team member set of the team.

In the method and apparatus for information interaction and the electronic device according to the embodiments of this disclosure, the team identifier is displayed on the information interaction interface, where the team indicated by the team identifier has the associated team member set; and at least one group associated with the team indicated by the team identifier is displayed, where the group of the at least one group at least includes a part of members of the team member set. Accordingly, the information of the group associated with the team is displayed and managed with the team as a unit, and the information within the team is limited to communication within the team member set. In this way, the interference to the non-team member can be reduced.

Also, the team member may know the information carried by the information communication entity within the team in real time, so that the information within the team is transparentized. The information transparency can be improved while the information interference can be reduced to a certain extent.

The computer program codes configured to execute operations of this disclosure can be written in one or more programming languages or combinations thereof. The above programming languages include, but are not limited to, object-oriented programming languages, such as Java, Smalltalk, and C++, and conventional procedural programming languages, such as "C" language. The program codes can be executed on a user's computer in all or in part, executed as an independent software package, executed on the user's computer in part and on a remote computer in part, or executed on the remote computer or a server in all. In the case involving the remote computer, the remote computer can be connected to the user's computer through any kind of network, including the local area network (LAN) or the wide area network (WAN), or can be connected to an external computer (for example, through the Internet on the basis of an Internet service provider).

The flowcharts and block diagrams in the accompanying drawings illustrate possibly implementable system architectures, functions, and operations of the systems, methods, and computer program products according to various embodiments of this disclosure. In this regard, each block in the flowcharts or the block diagrams can represent a module, a program segment, or a code segment, which encompasses one or more executable instructions configured to implement specified logical functions. It should also be noted that in some alternative implementations, the functions noted in the blocks can also occur in an order other than those noted in the accompanying drawings. For example, two blocks represented in succession can in fact be executed substantially in parallel or in a reverse order sometimes, depending on the functions involved. It should also be noted that each block in the block diagrams and/or the flowcharts and combinations of blocks in the block diagrams and/or the flowcharts can be implemented through special-purpose hardware-based systems that execute the specified functions or operations, or can be implemented through combinations of special-purpose hardware and computer instructions.

The unit described in the embodiment of this disclosure can be implemented through software or hardware. The name of the unit is not intended to define of the unit under certain circumstances.

The above functions herein can be executed, at least in part, by one or more hardware logical components. For example, non-restrictively, illustrative types of usable hardware logical components include: a field programmable gate array (FPGA), an application specific integrated circuit (ASIC), an application specific standard product (ASSP), a system on chip (SOC), a complex programmable logic device (CPLD), etc.

In the context of this disclosure, a machine-readable medium can be a tangible medium that can encompass or store a program to be used by or in combination with the instruction execution system, apparatus, or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device, or any suitable combination of the above. More specific instances of the machine-readable storage media include a portable computer disk, a hard disk, a random access memory (RAM), a read-only memory (ROM), an erasable programmable read-only memory (EPROM) or a flash memory, an optical fiber, a portable compact disk read-only memory (CD-ROM), an optical storage device, and a magnetic storage device that are each electrically connected through one or more wires, or any suitable combination of the above.

What are described above are merely the preferred embodiments of this disclosure and the descriptions of the technical principles applied. It should be understood by those skilled in the art that the scope of disclosure involved in this disclosure is not limited to the technical solutions formed by specific combinations of the above technical features, and should also cover other technical solutions formed by random combinations of the above technical features or their equivalents without departing from the concept disclosed above. For example, the technical solutions formed through mutual replacement between the above features and the technical features having similar functions disclosed in this disclosure (but not limited thereto).

In addition, all the operations are depicted in a specific order. However, it should not be understood that these operations are required to be executed in the specific order shown or in a successive order. Under certain circumstances, multitasking and parallel processing may be advantageous. Similarly, several specific embodiment details are encompassed in the above discussion, but should not be interpreted as limiting the scope of this disclosure. Some features that are described in the context of separate embodiments can also be implemented jointly in a single embodiment. Likewise, various features that are described in the context of a single embodiment can also be implemented in a plurality of embodiments separately or in any suitable sub-combination manner.

Although the subject has been described in language specific to structural features and/or logical method actions, it should be understood that the subject defined in the appended claims is not necessarily limited to the above specific features or actions. Rather, the above specific features and actions are merely illustrative forms for implementing the claims.

We claim:

1. A method for information interaction, comprising:
displaying an interface element in a first area of an information interaction interface, wherein the interface element is configured to implement display of information associated with at least one team in a second area of the information interaction interface, and wherein the at least one team comprises team members;
in response to detecting a selection of the interface element, displaying at least one team identifier of the at least one team and information of at least one group associated with the at least one team in the second area of the information interaction interface, wherein the at least one group comprises at least a subset of the team members;
wherein the method further comprises:
displaying, in a conversation stream displayed on the information interaction interface, information of the at least one group associated with the at least one team upon determining that a screening tag other than the interface element on the information interaction interface is selected, wherein the conversation stream is configured to display individual conversation information and group conversation information, and wherein the information of the at least one group associated with the at least one team displayed in the conversation stream comprises information indicating that the at least one group is associated with the at least one team; and creating a team, wherein the creating a team comprises:
- receiving a team creation instruction, the team creation instruction comprising a team identifier and team member information, and creating the team based on the team identifier and the team member information, or
- generating the team based on information of an existing group based on a preset group attribute change operation performed by a user on the existing group, wherein the preset group attribute change operation is configured to instruct to change the existing group from a group attribute to a team attribute.

2. The method according to claim 1,
wherein the at least one group further comprises a non-team member.

3. The method according to claim 1, wherein the at least one group displayed is a group for which a current user who logs in the information interaction interface has viewing permission; wherein
the group for which the current user has viewing permission comprises: a group m which the current user is a group member, and a group in which the current user is not a group member but providing viewing permission to the current user; and a part of the at least one group are invisible to a user who does not have viewing permission.

4. The method according to claim 1, wherein an editing operation is executable on an association relation between a part of the at least one group and the at least one team, and the association relation between the at least one group and the team is changed through the editing operation.

5. The method according to claim 4, wherein the at least one team identifier is displayed in a team information display area, the editing operation comprises establishing an association relation, and the association relation between a target group and the at least one team is established based on the following:
- receiving a first preset operation executed by a current user on the team information display area, and displaying a group addition option configured to indicate addition of a group associated with a team;
- displaying a group addition window according to a received selection operation executed on the group addition option; and
- associating the target group with the at least one team indicated by the at least one team identifier according to a target group determination operation executed by the user on the group addition window.

6. The method according to claim 5, comprising:
determining a type of the target group according to a group type setting operation executed by the user on the target group; wherein
the group type setting operation executed on the target group comprises: a selection operation executed by the user on at least one candidate group type option displayed; or a group type input operation executed by the user on the target group.

7. The method according to claim 5, wherein
the group addition option comprises an existing group addition option;
displaying the group addition window according to the received selection operation executed on the group addition option comprises: displaying an existing group list according to a received selection operation executed on the existing group addition option; wherein the existing group list comprises at least one existing group; and
associating the target group with the team indicated by the team identifier according to the target group determination operation executed by the user on the group addition window comprises: determining at least one target group according to a selection operation executed by the user on the existing group list, and establishing the association relation between the target group and the team.

8. The method according to claim 5, wherein
the group addition option comprises a new group creation option;
displaying the group addition window according to the received selection operation executed on the group addition option comprises: displaying a group creation window configured to create a group according to a received selection operation executed on the new group creation option; wherein the group creation window comprises a candidate group member list; and
associating the target group with the team indicated by the team identifier according to the target group determination operation executed by the user on the group addition window comprises: determining a new group member according to a selection operation executed by the user on the candidate group member list; and creating a new group comprising the new group member, and associating the new group with the team.

9. The method according to claim 1, wherein the at least one group comprises a first group, the first group is automatically generated as the at least one team is created, and the first group comprises the team members of the at least one team; and group members of the first group are changed synchronously as the team members are changed so as to keep consistent with the team members.

10. The method according to claim 1, wherein the at least one group comprises a second group, a group member set of the second group is the same as a set of the team members, the second group is created based on the set of team members after the at least one team is created, or the second group is associated with the at least one team after being created;
the group member set of the second group is changed synchronously as the set of team members is changed; and
the set of team members is changed synchronously as the group member set of the second group is changed.

11. The method according to claim 1, wherein
the at least one group comprises at least one third group, and a group member set of the third group is a proper sub-set of the team member set; the third group is created based on the team member set after the team is created, or the third group is associated with the team after being created; and identifier information of the third group is visible to a member of the team other than a member of the third group; or
the at least one group comprises at least one fourth group, and a group member set of the fourth group is a proper sub-set of the team member set; the fourth group is created based on the team member set after the team is created, or the fourth group is associated with the team after being created; and identifier information of the fourth group is invisible to a member of the team other than a member of the fourth group.

12. The method according to claim 1, wherein the at least one group has a first group management function set before an association relation with the at least one team is established or after an association relation with the at least one team is unbound, and the at least one group has a second group management function set after the association relation with the at least one team is established; wherein the second group management function set has fewer management functions than the first group management function set.

13. The method according to claim 1, further comprising:
removing, in response to receiving a request of a first user to get out of the team members, the first user from the at least one team and the at least one group associated with the at least one team; or unbinding an association relation between the at least one team and the at least one according to a received team dissolution instruction.

14. The method according to claim 1, wherein the at least one group comprises a first group and another group, the first group is configured to send a team-level system notification message; and the method further comprises:

sending a corresponding notification message in the first group in response to occurrence of a team-level event; and sending a corresponding notification message in a corresponding group in response to occurrence of a group-level event, and sending a corresponding notification message in the first group upon determining that the group-level event satisfies a first predetermined condition.

15. The method according to claim 1, further comprising:
displaying at least one another information communication entity associated with the at least one team indicated by the at least one team identifier; wherein the at least one another information communication entity comprises one or more of the following: a document, a calendar, and a conference.

16. An electronic device, comprising:
one or more processors; and
a storage means configured to store one or more programs;
the one or more programs, when executed by the one or more processors, causing the one or more processors to implement operations comprising:

displaying an interface element in a first area of an information interaction interface, wherein the interface element is configured to implement display of information associated with at least one team in a second area of the information interaction interface, and wherein the at least one team comprises team members;

in response to detecting a selection of the interface element, displaying at least one team identifier of the at least one team and information of at least one group associated with the at least one team in the second area of the information interaction interface, wherein the at least one group comprises at least a subset of the team members;

wherein the operations further comprise:
displaying, in a conversation stream displayed on the information interaction interface, information of the at least one group associated with the at least one team upon determining that a screening tag other than the interface element on the information interaction interface is selected, wherein the conversation stream is configured to display individual conversation information and group conversation information, and wherein the information of the at least one group associated with the at least one team displayed in the conversation stream comprises information indicating that the at least one group is associated with the at least one team; and creating a team, wherein the creating a team comprises:
receiving a team creation instruction, the team creation instruction comprising a team identifier and team member information, and creating the team based on the team identifier and the team member information, or generating the team based on information of an existing group based on a preset group attribute change operation performed by a user on the existing group, wherein the preset group attribute change operation is configured to instruct to change the existing group from a group attribute to a team attribute.

17. A non-transitory computer-readable storage medium, storing a computer program thereon, wherein the computer program, when executed by a processor, causes the processor to implement operations comprising:

displaying an interface element in a first area of an information interaction interface, wherein the interface element is configured to implement display of information associated with at least one team in a second area of the information interaction interface, and wherein the at least one team comprises team members;

in response to detecting a selection of the interface element, displaying at least one team identifier of the at least one team and information of at least one group associated with the at least one team in the second area of the information interaction interface, wherein the at least one group comprises at least a subset of the team members;

wherein the operations further comprise:
displaying, in a conversation stream displayed on the information interaction interface, information of the at least one group associated with the at least one team upon determining that a screening tag other than the interface element on the information interaction interface is selected, wherein the conversation stream is configured to display individual conversation information and group conversation information, and wherein the information of the at least one group associated with the at least one team displayed in the conversation stream comprises information indicating that the at least one group is associated with the at least one team; and creating a team, wherein the creating a team comprises:
receiving a team creation instruction, the team creation instruction comprising a team identifier and team member information, and creating the team based on the team identifier and the team member information, or generating the team based on information of an existing group based on a preset group attribute change operation performed by a user on the existing group, wherein the preset group attribute change operation is configured to instruct to change the existing group from a group attribute to a team attribute.

* * * * *